United States Patent
Furuto

(10) Patent No.: US 10,404,057 B2
(45) Date of Patent: Sep. 3, 2019

(54) POWER SUPPLY CONTROL APPARATUS

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Ken Furuto, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

(*) Notice: Subject to any disclaimer, the term of this patent is extended or adjusted under 35 U.S.C. 154(b) by 254 days.

(21) Appl. No.: 15/543,083

(22) PCT Filed: Jan. 6, 2016

(86) PCT No.: PCT/JP2016/050235
§ 371 (c)(1),
(2) Date: Jul. 12, 2017

(87) PCT Pub. No.: WO2016/114196
PCT Pub. Date: Jul. 21, 2016

(65) Prior Publication Data
US 2018/0026436 A1    Jan. 25, 2018

(30) Foreign Application Priority Data

Jan. 15, 2015 (JP) ................ 2015-006191

(51) Int. Cl.
*H02M 3/156* (2006.01)
*H02H 5/04* (2006.01)
*H02H 3/08* (2006.01)

(52) U.S. Cl.
CPC ............... *H02H 5/04* (2013.01); *H02H 3/08* (2013.01); *H02H 5/041* (2013.01)

(58) Field of Classification Search
CPC .......... H02H 5/04; H02H 5/041; H02H 7/268; H02H 3/085; H02H 6/00; H02H 1/06;
(Continued)

(56) References Cited

U.S. PATENT DOCUMENTS 6,031,703 A * 2/2000 Serpinet ............... H02H 3/085
                                                    361/103
8,514,537 B2 * 8/2013 Higuchi ................ H02M 3/156
                                                    361/103
(Continued)

FOREIGN PATENT DOCUMENTS

JP    2007-151380    6/2007
JP    2010-239835    10/2010
(Continued)

OTHER PUBLICATIONS

Search Report for PCT/JP2016/050235, dated Mar. 8, 2016.

*Primary Examiner* — Alesa Allgood
(74) *Attorney, Agent, or Firm* — Honigman LLP

(57) ABSTRACT

A control circuit controls power supplied via an electrical wire, by turning a FET provided on the electrical wire on/off. A control unit calculates the temperature difference between the ambient temperature of the electrical wire and the electrical wire temperature in time series, based on a previous temperature difference between the ambient temperature of the electrical wire 5 and the electrical wire temperature that was calculated previously, and the value of current flowing through the electrical wire. The control unit is configured to suspend this time-series calculation of the temperature difference, and clocks the elapsed time from suspension to resumption of calculation of the temperature difference. The control unit, in the case where calculation of
(Continued)

the temperature difference is resumed, sets an initial temperature difference to be used as the previous temperature difference, based on the clocked elapsed time, in an initial calculation of the temperature difference after resumption.

7 Claims, 6 Drawing Sheets

(58) Field of Classification Search
CPC ........ H02H 3/093; H02H 5/047; B60R 16/02; H02M 3/156
See application file for complete search history.

(56) References Cited

U.S. PATENT DOCUMENTS

| | | | |
|---|---|---|---|
| 2007/0103820 A1 | 5/2007 | Kobayashi et al. | |
| 2012/0022708 A1* | 1/2012 | Higuchi | H02J 7/0031 700/293 |
| 2012/0081076 A1* | 4/2012 | Fujimura | H01M 10/0431 320/134 |
| 2012/0182004 A1* | 7/2012 | Higuchi | H02M 3/156 323/284 |
| 2013/0206730 A1* | 8/2013 | Furukawa | B23H 7/04 219/69.12 |
| 2013/0250463 A1* | 9/2013 | Ueta | H02H 7/18 361/87 |
| 2015/0003491 A1* | 1/2015 | Matsumoto | G01K 1/20 374/1 |

FOREIGN PATENT DOCUMENTS

| | | | | |
|---|---|---|---|---|
| JP | 2014209824 | * | 4/2013 | ............ H03H 6/00 |
| JP | 2014-209824 | | 6/2014 | |
| WO | WO-2016136713 A1 | * | 9/2016 | ............ H02H 5/041 |
| WO | WO-2016140101 A1 | * | 9/2016 | ............ B60R 16/02 |

* cited by examiner

| Range of counter value Nc | Set temperature difference |
|---|---|
| 0<Nc≦1 | ΔT1 |
| 2≦Nc≦4 | ΔT2 |
| 5≦Nc≦8 | ΔT3 |
| 9≦Nc≦13 | ΔT4 |
| 14≦Nc | ΔT5 |

POWER SUPPLY CONTROL APPARATUS

CROSS-REFERENCE TO RELATED APPLICATIONS

This application is the U.S. national stage of PCT/JP2016/050235 filed Jan. 6, 2016, which claims priority of Japanese Patent Application No. JP 2015-006191 filed Jan. 15, 2015.

TECHNICAL FIELD

The present invention relates to a power supply control apparatus that, by turning a switch provided on an electrical wire on/off, controls power supplied via the electrical wire.

BACKGROUND

Currently, power supply control apparatuses (e.g., see JP 2010-239835A) that, by turning a switch provided on an electrical wire connecting a battery and a load such as a motor, for example, on/off, control power supply from the battery to the load via the electrical wire have been proposed.

The power supply control apparatus described in JP 2010-239835A receives input of a signal instructing to start or end power supply to the load. The power supply control apparatus described in JP 2010-239835A turns the switch on/off in accordance with the contents indicated by the input signal, and calculates the temperature difference between the ambient temperature of the electrical wire and the electrical wire temperature in time series, based on the value of current flowing through the electrical wire.

This temperature difference is calculated based on a previous temperature difference calculated previously and the value of current flowing through the electrical wire. In the case where the electrical wire temperature calculated by adding the ambient temperature to the calculated temperature difference is greater than or equal to a predetermined temperature, the switch is turned off regardless of the contents of the input signal. Power supply via the electrical wire thereby stops and the electrical wire temperature falls, thus avoiding any risk of smoke being generated or fire starting from the electrical wire.

Also, the power supply control apparatus described in Patent Document suspends time-series calculation of the temperature difference and suppresses power consumption, in the case where the calculated temperature difference is approximately zero, in a state in which the switch is off due to a signal instructing to end power supply having been input.

In the initial calculation after time-series calculation of the temperature difference is resumed, an initial temperature difference to be used as the previous temperature difference is set to zero.

However, the power supply control apparatus described in JP 2010-239835A does not suspend time-series calculation of the temperature difference until the calculated temperature difference is approximately zero. Thus, with the power supply control apparatus described in JP 2010-239835A, there is a problem in that power consumption remains large, due to the short period for which time-series calculation of the temperature difference is suspended.

As a configuration that solves this problem, the power supply control apparatus described in JP 2010-239835A could conceivably be configured to suspend time-series calculation of the temperature difference regardless of the calculated temperature difference.

However, with this configuration, time-series calculation of the temperature difference could possibly be resumed in a state in which the actual temperature difference between the electrical wire temperature and the ambient temperature is high. In this case, since the initial temperature difference is set to zero, an inappropriate temperature difference smaller than the actual temperature difference is calculated. Accordingly, since the calculated electrical wire temperature is lower than the actual electrical wire temperature, there is a risk that power supply will not be stopped, despite the actual electrical wire temperature being a temperature at which power supply via the electrical wire should be stopped in order to prevent the electrical wire temperature from rising.

The present invention was made in view of the above situation, and an object of the invention is to provide a power supply control apparatus that is able to reduce power consumption and to appropriately calculate the temperature difference between the ambient temperature of an electrical wire and the electrical wire temperature.

SUMMARY

A power supply control apparatus according to the present invention is a power supply control apparatus including a power supply control unit that, by turning a switch provided on an electrical wire on/off, controls power supplied via the electrical wire, and a calculation unit that calculates a temperature difference between an ambient temperature of the electrical wire and an electrical wire temperature in time series, based on a value of current flowing through the electrical wire, in which the calculation unit is configured to calculate the temperature difference based on a previous temperature difference calculated previously and the value of the current, and to suspend time-series calculation of the temperature difference in a state in which the power supply control unit has turned the switch off, and the apparatus is provided with a clocking unit that clocks elapsed time from suspension to resumption of the calculation by the calculation unit, and a setting unit that, in the case where the calculation is resumed by the calculation unit, sets an initial temperature difference to be used as the previous temperature difference in an initial calculation after resumption, based on a temperature difference calculated before the calculation is suspended by the calculation unit and the elapsed time clocked by the clocking unit.

In the present invention, power supply via an electrical wire connecting a battery and a load is controlled by turning a switch provided on the electrical wire on/off, and the temperature difference between the ambient temperature of the electrical wire and the electrical wire temperature is calculated in time series, for example. The temperature difference is calculated based on a previous temperature difference calculated previously and the value of current flowing through the electrical wire. Also, the switch is turned on/off based on the electrical wire temperature which is calculated by adding the ambient temperature to the calculated temperature difference, for example.

Also, time-series calculation of the temperature difference is suspended in a state in which the switch is off. In the case where time-series calculation of the temperature difference is suspended, elapsed time from suspension to resumption of the calculation is clocked. In the case where calculation of the temperature difference is resumed, an initial temperature difference to be used as the previous temperature difference in an initial calculation of the temperature difference after resumption is set based on a temperature difference calculated before the calculation is suspended by the calculation unit and the clocked elapsed time. For example, a large initial temperature difference is set in the case where the elapsed time is short, and a small initial temperature difference is set in the case where the elapsed time is long. In the initial calculation of the temperature difference after resuming calculation, the temperature difference is calculated based on the initial temperature difference and the value of current flowing through the electrical wire.

It is possible to set the initial temperature difference to a temperature difference approximating the actual temperature difference that occurs at the point in time at which time-series calculation of the temperature difference is resumed, based on the clocked elapsed time. Thus, even in the case where time-series calculation of the temperature difference is suspended in a state in which the calculated temperature difference is sufficiently greater than approximately zero and, furthermore, time-series calculation of the temperature difference is resumed in a state in which the actual temperature difference between the ambient temperature and the electrical wire temperature is high, a temperature difference approximating the actual temperature difference can be calculated, and it is possible to appropriately calculate the temperature difference between the ambient temperature and the electrical wire temperature. Also, because time-series calculation of the temperature difference can be suspended even in the case where the calculated temperature difference is large, the period for which calculation is suspended can be lengthened, enabling power consumption to be lowered.

The power supply control apparatus according to the present invention may be characterized in the setting unit being configured to calculate the temperature difference ΔTc between the ambient temperature and the electrical wire temperature by substituting the temperature difference ΔTp calculated before the calculation is suspended by the calculation unit and the elapsed time te clocked by the clocking unit into the following equation, and to set the calculated temperature difference ΔTc as the initial temperature difference.

$$\Delta Tc = \Delta Tp \times \exp(-te/\tau)$$

where $\tau$: electrical wire heat dissipation time constant of the electrical wire.

In the present invention, in the case of resuming time-series calculation of the temperature difference, the temperature difference ΔTc between the ambient temperature of the electrical wire and the electrical wire temperature is calculated, by substituting the temperature difference ΔTp calculated before the calculation is suspended and the clocked elapsed time te into the aforementioned computation equation. The calculated temperature difference ΔTc is then set as the initial temperature difference. The aforementioned computation equation is a computation equation that is derived from the computation equation that is used in the case of calculating the temperature difference based on a previous temperature difference and the value of current flowing through the electrical wire. Thus, the initial temperature difference matches or approximately matches the actual temperature difference that occurs at the point in time at which time-series calculation of the temperature difference is resumed.

A power supply control apparatus according to the present invention is a power supply control apparatus including a power supply control unit that, by turning a switch provided on an electrical wire on/off, controls power supplied via the electrical wire, and a calculation unit that calculates a temperature difference between an ambient temperature of the electrical wire and an electrical wire temperature in time series, based on a value of current flowing through the electrical wire, in which the calculation unit is configured to calculate the temperature difference based on a previous temperature difference calculated previously and the value of the current, and to suspend time-series calculation of the temperature difference in a state in which the power supply control unit has turned the switch off, the apparatus is provided with a clocking unit that clocks elapsed time from suspension to resumption of the calculation by the calculation unit, and a setting unit that, in the case where the calculation is resumed by the calculation unit, sets an initial temperature difference to be used as the previous temperature difference in an initial calculation after resumption, based on the elapsed time clocked by the clocking unit, and the calculation unit is configured to suspend the calculation in a case where the calculated temperature difference is less than a predetermined temperature difference.

In the present invention, power supply via an electrical wire is controlled by turning a switch provided on the electrical wire on/off, and the temperature difference between the ambient temperature of the electrical wire and the electrical wire temperature is calculated in time series. The temperature difference is calculated based on a previous temperature difference calculated previously and the value of current flowing through the electrical wire.

Also, time-series calculation of the temperature difference is suspended in the case where the calculated temperature difference is less than a predetermined temperature in a state in which the switch is off. Elapsed time from suspension to resumption of the calculation is clocked. In the case where calculation of the temperature difference is resumed, an initial temperature to be used as the previous temperature difference in an initial calculation of the temperature difference after resumption is set based on the clocked elapsed time. In the initial calculation of the temperature difference after resuming calculation, the temperature difference is calculated based on the initial temperature difference and the value of current flowing through the electrical wire.

It is possible to set the initial temperature difference to a temperature difference approximating the actual temperature difference that occurs at the point in time at which time-series calculation of the temperature difference is resumed, based on the clocked elapsed time. Thus, even in the case where time-series calculation of the temperature difference is suspended in a state in which the calculated temperature difference is sufficiently greater than approximately zero and, furthermore, time-series calculation of the temperature difference is resumed in a state in which the actual temperature difference between the ambient temperature and the electrical wire temperature is high, a temperature difference approximating the actual temperature difference can be calculated, and it is possible to appropriately calculate the temperature difference between the ambient temperature and the electrical wire temperature. Also, because time-series calculation of the temperature difference can be suspended even in the case where the calculated temperature difference is large, the period for which calculation is suspended can be lengthened, enabling power consumption to be lowered.

The power supply control apparatus according to the present invention may be characterized in the setting unit being configured to calculate the temperature difference ΔTc between the ambient temperature and the electrical wire temperature, by substituting the elapsed time te clocked by the clocking unit and the predetermined temperature difference ΔTs into the following equation, and to set the calculated temperature difference ΔTc as the initial temperature difference.

$$\Delta Tc = -As \times te + \Delta Ts$$

where As: positive constant

The power supply control apparatus according to the present invention may be characterized in being provided with a storage unit in which a temperature difference is stored in association with a time period, and the setting unit being configured to read out a temperature difference corresponding to the elapsed time clocked by the clocking unit from the storage unit, and to set the read temperature difference as the initial temperature difference.

In the present invention, temperature differences are stored in the storage unit in association with time periods. In the case where time-series calculation of the temperature difference is resumed, the temperature difference corresponding to the elapsed time is read out from the storage unit, and the read temperature difference is set as the initial temperature difference. Thus, it is possible to set the initial temperature difference with lower power consumption.

The power supply control apparatus according to the present invention may be characterized in the clocking unit being configured to clock the elapsed time by counting a number of times that a predetermined time period has elapsed from suspension of the calculation by the calculation unit, and the setting unit being configured to set the initial temperature difference, based on the number of times counted by the clocking unit.

In the present invention, clocking of the elapsed time is performed by counting the number of times that a predetermined time period has elapsed from suspension of time-series calculation of the temperature difference. Naturally, the elapsed time is longer the greater number of times the predetermined time period has elapsed, and the elapsed time is shorter the fewer number of times the predetermined time elapsed. The initial temperature difference is then set, based on the counted number of times.

The power supply control apparatus according to the present invention may be characterized in the power supply control unit being configured to turn the switch off in a case where the electrical wire temperature calculated by adding the ambient temperature to the temperature difference calculated by the calculation unit is greater than or equal to a predetermined temperature.

In the present invention, the switch is turned off in the case where the electrical wire temperature calculated by adding the ambient temperature of the electrical wire to the temperature difference calculated in time series is greater than or equal to a predetermined temperature. Because power supply via the electrical wire is thereby stopped and the electrical wire temperature falls, any chance of smoke being generated or fire starting from the electrical wire is prevented.

Advantageous Effects of Invention

According to the present invention, power consumption can be reduced and the temperature difference between the ambient temperature of the electrical wire and the electrical wire temperature can be appropriately calculated.

DETAILED DESCRIPTION OF PREFERRED EMBODIMENTS

Hereinafter, the present invention will be described in detail based on drawings showing embodiments thereof.

First Embodiment

Figure 1:
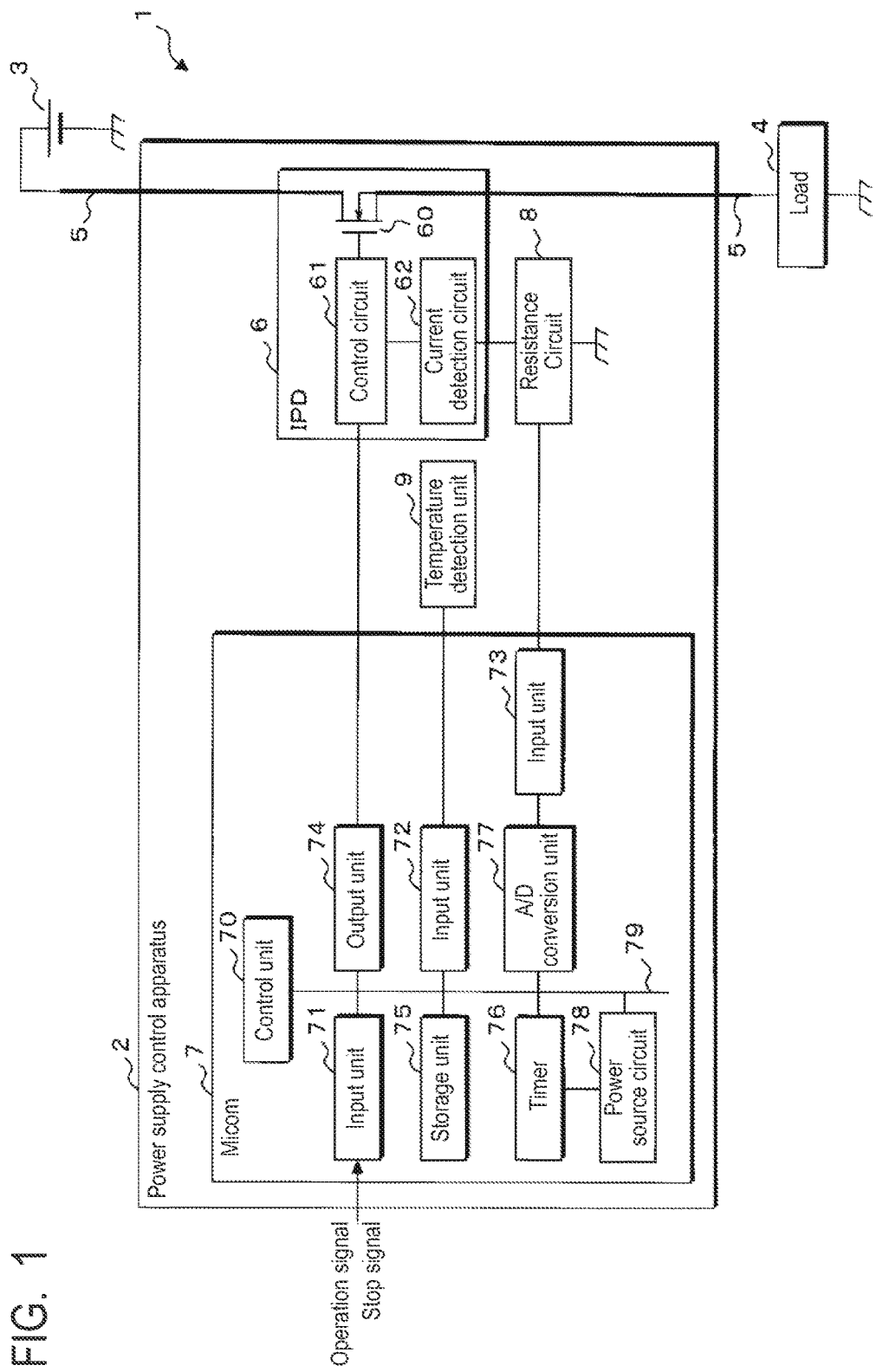
FIG. 1 is a block diagram showing the configuration of a main section of a power system in the first embodiment.

FIG. 1 is a block diagram showing the configuration of a main section of a power system 1 in a first embodiment. The power system 1 is favorably installed in a vehicle, and is provided with a power supply control apparatus 2, a battery 3, a load 4 and an electrical wire 5. The power supply control apparatus 2 is provided on the electrical wire 5, with one end of the electrical wire 5 being connected to a positive electrode of the battery 3 and the other end of the electrical wire 5 being connected to one end of the load 4. The negative electrode of the battery 3 and the other end of the load 4 are grounded.

The battery 3 supplies power to the load 4 via the electrical wire 5. The load 4 is an electrical device such as a headlight or a wiper motor. The load 4 operates in the case where power is supplied by the battery 3, and stops in the case where power supply from the battery 3 stops.

One of an operation signal instructing operation of the load 4 and a stop signal instructing to stop operation of the load 4 is input to the power supply control apparatus 2. The power supply control apparatus 2, in the case of the operation signal being input, causes the battery 3 to supply power to the load 4, and operates the load 4. Also, the power supply control apparatus 2, in the case of the stop signal being input, stops power supply from the battery 3 to the load 4, and stops operation of the load 4.

Also, the power supply control apparatus 2 calculates the electrical wire temperature of the electrical wire 5. The power supply control apparatus 2 stops power supply from the battery 3 to the load 4, in the case where the calculated electrical wire temperature is greater than or equal to a temperature threshold value, regardless of whether one of the operation signal and the stop signal is being input, and prevents any chance of smoke being generated or fire starting from the electrical wire 5.

Furthermore, the power supply control apparatus 2 also stops power supply from the battery 3 to the load 4, in the case where a current greater than or equal to a current threshold value flows through the electrical wire 5, regardless of whether one of the operation signal and the stop signal is being input, and prevents any chance of an overcurrent flowing through the electrical wire 5.

The power supply control apparatus 2 has an IPD (Intelligent Power Device) 6, a microcomputer (hereinafter, referred to as MICOM) 7, a resistance circuit 8, and a temperature detection unit 9. The IPD 6 is provided on the electrical wire 5, and is separately connected to the MICOM 7 and the resistance circuit 8. The MICOM 7 is further separately connected to the resistance circuit 8 and the temperature detection unit 9. The resistance circuit 8 is grounded.

The IPD 6 has an N-channel FET (Field Effect Transistor) 60, a control circuit 61, and a current detection circuit 62. The FET 60 is provided on the electrical wire 5, with a drain of the FET 60 being connected to the positive electrode of the battery 3 via the electrical wire 5, and a source of the FET 60 being connected to one end of the load 4 via the electrical wire 5. A gate of the FET 60 is connected to the control circuit 61. The control circuit 61 is separately connected to the MICOM 7 and the current detection circuit 62, apart from the gate of the FET 60. The current detection circuit 62 is further connected to the resistance circuit 8.

The FET 60 functions as a switch. In the case where the voltage being applied to the gate of the FET 60 is greater than or equal to a given voltage, it is possible for current to flow between the drain and the source of the FET 60, and the FET 60 is on. In the case where the voltage being applied to the gate of the FET 60 is less than the given voltage, current does not flow between the drain and the source of the FET 60, and the FET 60 is off. Voltage is applied to the gate of the FET 60 by the control circuit 61. The control circuit 61 turns the FET 60 on/off by adjusting the voltage being applied to the gate of the FET 60.

A power supply instruction that instructs power supply from the battery 3 to the load 4, and a disconnect instruction that instructs to disconnect power supply from the battery 3 to the load 4 are input to the control circuit 61 from the MICOM 7. The control circuit 61 turns the FET 60 on, in the case where the power supply instruction is input. The battery 3 thereby supplies power to the load 4, and the load 4 operates. The control circuit 61 turns the FET 60 off, in the case where the disconnect instruction is input. Power supply from the battery 3 to the load 4 is thereby disconnected, and the load 4 stops. As abovementioned, the control circuit 61 controls power supplied via the electrical wire 5 by turning the FET 60 on/off, and functions as a power supply control unit.

The current detection circuit 62 outputs one part of a predetermined number, such as ¼000th, for example, of the current flowing through the electrical wire 5 to the resistance circuit 8. The current output from the current detection circuit 62 flows to a ground potential via the resistance circuit 8.

The control circuit 61 turns the FET 60 off regardless of whether one of the power supply instruction and the disconnect instruction is being input from the MICOM 7, in the case where the current ouput by the current detection circuit 62 to the resistance circuit 8 is greater than or equal to a current threshold value, that is, in the case where a current exceeding a tolerance range is flowing through the electrical wire 5. Any chance of an overcurrent flowing through the electrical wire 5 is thereby prevented.

The resistance circuit 8 has one or more resistors. A voltage proportional to the current flowing via the resistance circuit 8 is input to the MICOM 7. In the resistance circuit 8, one end of a resistor which is not illustrated is connected to the current detection circuit 62 and the MICOM 7 and the other end of the resistor is grounded, for example, and the current output by the current detection circuit 62 flows to the ground potential via this resistor. In this case, an analog value of the voltage that is input to the MICOM 7 is represented by the product of the value of current flowing through a resistor of the resistance circuit 8 and the resistance value of that resistor. Here, since the resistance value is a constant, the value of the voltage that is input to the MICOM 7 from the resistance circuit 8 is proportional to the value of current flowing via the resistance circuit 8. Also, because the value of current flowing through the electrical wire 5 is a current value obtained by multiplying the value of current that is output by the current detection circuit 62 by the predetermined number, the value of current flowing through the electrical wire 5 is a value obtained by dividing the value of the voltage that is input to the MICOM 7 by the aforementioned resistance value and multiplying the result by the predetermined number.

The temperature detection unit 9 has a thermistor, for example, and detects an ambient temperature Ta of the electrical wire 5. The temperature detection unit 9 outputs temperature information indicating the detected ambient temperature Ta to the MICOM 7.

The MICOM 7 has a control unit 70, input units 71, 72 and 73, an output unit 74, a storage unit 75, a timer 76, an A/D (Analog/Digital) conversion unit 77, and a power source circuit 78. The control unit 70, the input units 71 and 72, the output unit 74, the storage unit 75, the timer 76, the A/D conversion unit 77, and power source circuit 78 are each connected to a bus 79. The input unit 72, the output unit 74, and the A/D conversion unit 77 are respectively connected to the temperature detection unit 9, the control circuit 61 of the IPD 6 and the input unit 73, apart from the bus 79. The input unit 73 is further connected to the resistance circuit 8. Also, the timer 76 is directly connected to the power source circuit 78, not only via the bus 79.

The power source circuit 78 transforms the output voltage of the battery 3 to a predetermined voltage, for example. The power source circuit 78, by applying the transformed voltage to the control unit 70, the input units 71, 72 and 73, the output unit 74, the storage unit 75, the timer 76 and the A/D conversion unit 77 via a power line which is not illustrated, supplies power to these units.

The operation signal and the stop signal are input to the input unit 71. The input unit 71 notifies the control unit 70 that operation of the load 4 has been instructed in the case where the operation signal is input, and notifies the control unit 70 that stopping the operation of the load 4 has been instructed in the case where the stop signal is input.

Temperature information is input to the input unit 72 from the temperature detection unit 9. The temperature information input to the input unit 72 is acquired from the input unit 72 by the control unit 70.

As aforementioned, a voltage proportional to the current flowing from the current detection circuit 62 via the resistance circuit 8 is input to the input unit 73. The input unit 73 outputs an analog value of the voltage input by the resistance circuit 8 to the A/D conversion unit 77.

The A/D conversion unit 77 converts the analog voltage value input from the input unit 73 into a digital voltage value. Voltage information indicating the digital voltage value resulting from the conversion by the A/D conversion unit 77 is acquired from the A/D conversion unit 77 by the control unit 70.

The output unit 74 outputs the power supply instruction or the disconnect instruction to the control circuit 61 of the IPD 6, in accordance with an instruction of the control unit 70.

The control unit 70 has a CPU (Central Processing Unit), and executes various processing by executing a control program that is stored in a ROM (Read Only Memory) which is not illustrated. Specifically, the control unit 70 executes operation control processing for controlling operation of the load 4. The control unit 70 executes operation control processing by causing the output unit 74 to ouput the power supply instruction or the disconnect instruction, based on contents that are notified from the input unit 71, the ambient temperature Ta that is indicated by the temperature information acquired from the input unit 72, and the voltage value that is indicated by the voltage information acquired from the A/D conversion unit 77.

Also, the control unit 70, in the operation control processing, is configured to be capable of transitioning the MICOM 7 to a sleep state in which power consumption is suppressed, in the case where the operation signal has not been input to the input unit 71 for a predetermined period. Specifically, the control unit 70 outputs the sleep signal instructing to transition to the sleep state to the power source circuit 78 via the bus 79. The power source circuit 78, in the case where the sleep signal is input, stops power supply to the control unit 70, the input units 71, 72 and 73, the output unit 74 and the A/D conversion unit 77, and stops operation of these units. The power source circuit 78 does not, however, stop power supply to the storage unit 75 and the timer 76, and continues to supply power to the storage unit 75 and the timer 76.

In the case where the power source circuit 78 resumes power supply to the control unit 70, the input units 71, 72 and 73, the output unit 74 and the A/D conversion unit 77, these units operate and the MICOM 7 performs wake up.

The control unit 70, in addition to the operation control processing, also executes check processing for checking whether the operation signal has been input to the input unit 71, in the case where the MICOM 7 performs wakeup from the sleep state.

The storage unit 75 is a RAM (Random Access Memory), for example, and stores data, computation equations and the like required in order for the control unit 70 to execute operation control processing and check processing. Reading and writing of the contents that are stored in the storage unit 75 are performed by the control unit 70.

The timer 76 clocks time. The timer 76, in the case where the clocked time period is greater than or equal to a predetermined first time period t1, notifies the control unit 70 that the first time period t1 has elapsed. Thereafter, the timer 76 sets the clocked time period to zero, and starts clocking time again. The timer 76 notifies the control unit 70 every time the clocked time period becomes greater than or equal to the first time period t1.

The control unit 70 also outputs the sleep signal to the timer 76, via the bus 79, as well as to the power source circuit 78. The timer 76 sets the clocked time period to zero and starts clocking, in the case where the sleep signal is input. The timer 76 then outputs a wake up signal instructing to transition to the wake up state directly to the power source circuit 78, rather than via the bus 79, in the case where the clocked time period becomes greater than or equal to a predetermined second time period t2. The power source circuit 78 resumes power supply to the control unit 70, the input units 71, 72 and 73, the output unit 74 and the A/D conversion unit 77, in the case where the wake up signal is input, and the MICOM 7 wakes up. Thereafter, the timer 76 notifies the control unit 70 whenever the clocked time period becomes greater than or equal to the first time period t1, as aforementioned, until the sleep signal is again input from the control unit 70. The second time period t2 is greater than or equal to the first time period t1.

Figure 2:
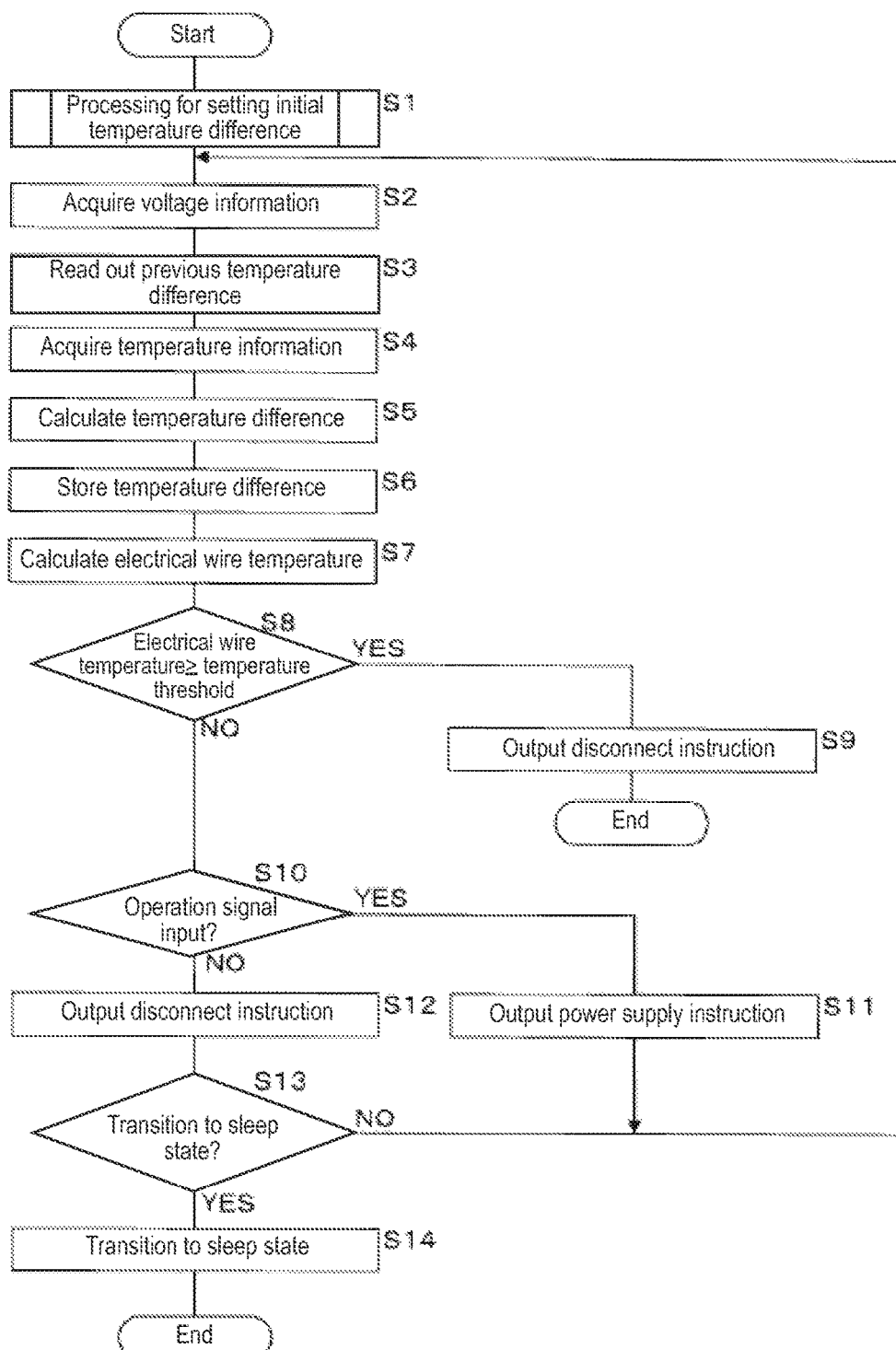
FIG. 2 is a flowchart showing the procedure of operation control processing that is executed by a control unit.

FIG. 2 is a flowchart showing the procedure of operation control processing that is executed by the control unit 70. The control unit 70 executes the operation control processing in the case where the operation signal is input to the input unit 71 after the MICOM 7 has transitioned to the sleep state. As aforementioned, the control unit 70 is repeatedly notified that the first time period t1 has elapsed by the timer 76. In the operation control processing, the control unit 70 calculates a temperature difference $\Delta Tw$ between the ambient temperature Ta of the electrical wire 5 and the electrical wire temperature, as will be discussed later, whenever the first time period t1 elapses. The temperature difference $\Delta Tw$ calculated previously, or specifically, the temperature difference $\Delta Tw$ calculated last time, is stored in the storage unit 75 as a previous temperature difference $\Delta Tp$.

The control unit 70, in the operation control processing, first performs processing for setting an initial temperature difference $\Delta Ti$ to be used in the initial calculation of the electrical wire temperature (step S1). By performing this setting processing, the initial temperature difference $\Delta Ti$ that is stored in the storage unit 75 is set. The initial temperature difference $\Delta Ti$ is used as the temperature difference between the ambient temperature Ta of the electrical wire 5 and electrical wire temperature at the point in time at which the operation control processing is started. Thus, the control unit 70 shifts the processing to step S2 required in computing the temperature difference $\Delta Tw$, after the first time period t1 has elapsed from execution of step S1.

The control unit 70, after executing step S1, acquires voltage information from the A/D conversion unit 77 (step S2), and reads out the previous temperature difference $\Delta Tp$ from the storage unit 75 (step S3). The control unit 70 reads out the initial temperature difference $\Delta Ti$ set at step S1 from the storage unit 75 as the previous temperature difference $\Delta Tp$, in the case of executing step S3 for the first time in the operation control processing. The control unit 70, after executing step S3, acquires temperature information indicating the ambient temperature Ta detected by the temperature detection unit 9 from the input unit 72 (step S4).

Note that the voltage information that is acquired by the A/D conversion unit 77 and the temperature information that is acquired from the input unit 72 are updated in an interval less than or equal to the first time period t1.

Next, the control unit 70 calculates the temperature difference $\Delta Tw$ between the ambient temperature Ta of the electrical wire 5 and the electrical wire temperature, based on the voltage value that is indicated by the voltage information acquired at step S2, the previous temperature difference $\Delta Tp$ read out at step S3, and the ambient temperature Ta that is indicated by the temperature information acquired at step S4 (step S5). Since the voltage value that is indicated by the voltage information is proportional to the value of current flowing through the electrical wire 5, as aforementioned, calculating the temperature difference based on the voltage value that is indicated by the voltage information is equivalent to calculating the temperature difference based on the value of current flowing through the electrical wire 5. The control unit 70 functions as a calculation unit.

In step S5, the temperature difference $\Delta Tw$ is calculated using computation equations (1) and (2) shown below.

$$\Delta Tw = \Delta Tp \times \exp(-t1/\tau) + Rth \times Rw \times Iw^2 \times (1-\exp(-t1/\tau)) \quad (1)$$

$$Rw = Ro \times (1 + \kappa \times (Ta + \Delta Tp - To)) \quad (2)$$

The variables and constants that are used in the computation equations (1) and (2) will be described. The units of the variables or constants will also be given in the description of the variables and constants. $\Delta Tw$, $\Delta Tp$, $t1$ and $Ta$ are, as aforementioned, respectively the calculated temperature difference (° C.), the previous temperature difference (° C.), the time interval (s) for calculating the temperature difference $\Delta Tw$, and the ambient temperature (° C.) of the electrical wire 5. $\tau$ is the electrical wire heat dissipation time constant (s) of the electrical wire 5.

Rth is the electrical wire heat resistance (° C./W) of the electrical wire 5, and Rw is the electrical wire resistance ($\Omega$) of the electrical wire 5. To is a predetermined temperature (° C.), and Ro is the electrical wire resistance ($\Omega$) at the temperature To. $\kappa$ is the electrical wire resistance temperature coefficient (/° C.) of the electrical wire 5. Iw is the value (A) of the current flowing through the electrical wire 5, and is calculated from the voltage value that is indicated by the voltage information acquired from the A/D conversion unit 77. $\Delta Tw$, $\Delta Tp$, Iw and Ta are variables, and t1, tau, Rth, Ro, $\kappa$ and To are constants that are set in advance.

Because the value of the first term of the computation equation (1) falls as the length of the first time period t1 increases, the first term of the computation equation (1) represents the heat dissipation of the electrical wire 5. Also, because the value of the second term of the computation equation (1) rises as the length of the first time period t1 increases, the second term of the computation equation (1) represents the heat generation of the electrical wire 5.

In step S5, the control unit 70 calculates the temperature difference $\Delta Tw$, by substituting the current value Iw calculated from the voltage value that is indicated by the voltage information acquired at step S2, the previous temperature difference $\Delta Tp$ read out at step S3 and the ambient temperature Ta that is indicated by the temperature information acquired at step S4 into the computation equations (1) and (2).

Next, the control unit 70 stores the temperature difference $\Delta Tw$ calculated at step S5 in the storage unit 75 as the previous temperature difference $\Delta Tp$ (step S6). Thereafter, the control unit 70 calculates the electrical wire temperature of the electrical wire 5, by adding the temperature difference $\Delta Tw$ calculated at step S5 to the ambient temperature Ta that is indicated by the temperature information acquired at step S4 (step S7).

Next, the control unit 70 determines whether the electrical wire temperature calculated at step S7 is greater than or equal to a predetermined temperature threshold value stored in advance in the storage unit 75 (step S8). The control unit 70, in the case where it is determined that the electrical wire temperature is greater than or equal to the temperature threshold value (S8: YES), instructs the output unit 74 to output the disconnect instruction to the control circuit 61 of the IPD 6, regardless of whether one of the operation signal and the stop signal is being output to the input unit 71 (step S9). The control circuit 61 thereby turns the FET 60 off and stops power supply from the battery 3 to the load 4. The control unit 70, after executing step S9, ends the operation control processing.

In the operation control processing as abovementioned, the control circuit 61 turns the FET 60 off, in the case where the electrical wire temperature that the control unit 70 calculates by adding the ambient temperature Ta detected by the temperature detection unit 9 to the temperature difference $\Delta Tw$ calculated at step S5 is greater than or equal to the temperature threshold value. Because power supply from the battery 3 to the load 4 via the electrical wire 5 is thereby stopped, and the electrical wire temperature of the electrical wire 5 falls, any chance of smoke being generated or fire starting from the electrical wire 5 is prevented.

The control unit 70, in the case where it is determined that the electrical wire temperature is less than the temperature threshold value (S8: NO), determines whether the operation signal is being input to the input unit 71 (step S10). The control unit 70, in the case where it is determined that the operation signal is being input to the input unit 71 (S10: YES), instructs the output unit 74 to output the power supply instruction to the control circuit 61 of the IPD 6 (step S11). The control circuit 61 thereby turns the FET 60 on. In the case where the FET 60 has been turned on, the battery 3 supplies power to the load 4, and the load 4 operates.

The control unit 70, in the case where it is determined that the operation signal is not being input to the input unit 71, that is, that the stop signal is being input (S10: NO), instructs the output unit 74 to output the disconnect instruction to the control circuit 61 of the IPD 6 (step S12). The control circuit 61 thereby turns the FET 60 off. In the case where the FET 60 has been turned off, power supply from the battery 3 to the load 4 is disconnected, and the load 4 stops.

The control unit 70, after executing step S12, determines whether to transition the MICOM 7 to the sleep state (step S13). In step S13, the control unit 70 determines to transition the MICOM 7 to the sleep state, in the case where the period for which the stop signal has been input to the input unit 71 is greater than or equal to a predetermined period. Also, the control unit 70 determines not to transition the MICOM 7 to the sleep state, in the case where the period for which the stop signal has been input to the input unit 71 is less than the predetermined period.

The control unit 70, after executing step S11 or in the case where it is determined not to transition the MICOM 7 to the sleep state (S13: NO), returns the processing to step S2, and again calculates the temperature difference $\Delta Tw$. The control unit 70 calculates the temperature difference $\Delta Tw$ in time series, or specifically, whenever the first time period t1 elapses, and repeatedly determines whether the electrical wire temperature is greater than or equal to the temperature threshold value, while the operation signal is being input to the input unit 71 or it is determined not to transition the MICOM 7 to the sleep state.

The control unit 70, in the case where it is determined to transition the MICOM 7 to the sleep state (S13: YES), transitions the MICOM 7 to the sleep state by outputting the sleep signal to both the timer 76 and the power source circuit 78 (step S14). Because power supply to the control unit 70 thereby stops, the control unit 70 suspends calculation of the temperature difference $\Delta Tw$. Thus, the control unit 70 suspends time-series calculation of the temperature difference $\Delta Tw$ in a state in which the control circuit 61 of the IPD 6 has turned the FET 60 off. The control unit 70, after executing step S14, ends the operation control processing.

In the case where the control unit 70 has executed step S14, the timer 76 starts clocking time. As aforementioned, the timer 76, in the case where the clocked time period becomes greater than or equal to the second time period, outputs the wake up signal to the power source circuit 78 to wake up the MICOM 7.

Figure 3:
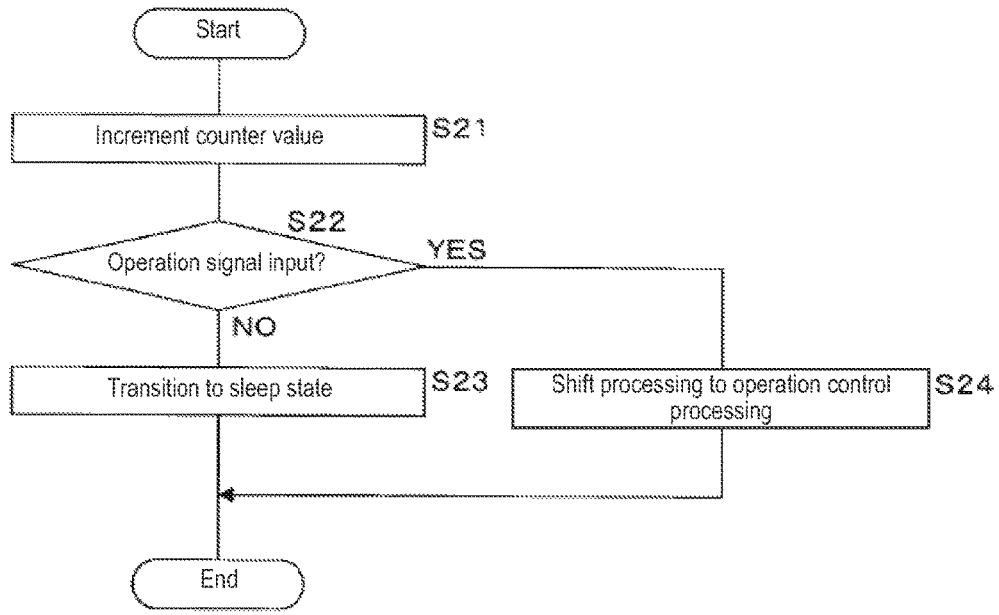
FIG. 3 is a flowchart showing the procedure of check processing that is executed by the control unit.

FIG. 3 is a flowchart showing the procedure of check processing that is executed by the control unit 70. The control unit 70, in the case where the MICOM 7 has woken up, executes the check processing. The control unit 70 first increments a counter value Nc that is stored in the storage unit 75 by 1 (step S21). The counter value Nc is set to zero, in the processing for setting the initial temperature difference ΔTi that is executed by the control unit 70 in the operation control processing. Thus, at the point in time at which the MICOM 7 has transitioned from the wake up state to the sleep state, the counter value Nc is zero.

The control unit 70 determines whether the operation signal is being input to the input unit 71 (step S22). The control unit 70, in the case where it is determined that the operation signal is not being input to the input unit 71 (S22: NO), transitions the MICOM 7 to the sleep state again, by outputting the sleep signal to the timer 76 and the power source circuit 78 (step S23), and ends the check processing. In the case where the control unit 70 has executed step S23, the timer 76, as aforementioned, sets the clocked time period to zero and starts clocking time. The timer 76 outputs the wake up signal to the power source circuit 78 in the case where the clocked time period becomes greater than or equal to the second time period. After the MICOM 7 thereby wakes up, the control unit 70 executes the check processing again.

As aforementioned, the counter value Nc is incremented by 1, whenever the check processing is executed. Accordingly, the counter value Nc indicates the number of times that the check processing has been continuously executed, that is, the number of times that the second time period t2 has elapsed in a state in which the control unit 70 has stopped calculation of the temperature difference ΔTw. The product of the counter value Nc and the second time period t2 is equivalent to the elapsed time from suspension to resumption of calculation of the temperature difference ΔTw by the control unit 70. Accordingly, the control unit 70, by continuously executing the check processing, counts the number of times that the second time period t2 has elapsed from suspension of the calculation of the temperature difference ΔTw, and clocks the aforementioned elapsed time using the counted number of times. The control unit 70 also functions as a clocking unit.

The control unit 70, in the case where it is determined that the operation signal is being input to the input unit 71 (S22: YES), shifts the processing to the operation control processing (step S24), and ends the check processing.

In the processing for setting the initial temperature difference ΔTi that is executed by the control unit 70 for the first time, after the processing is shifted to the operation control processing, the counter value Nc that is stored in the storage unit 75 is used.

Figure 4:
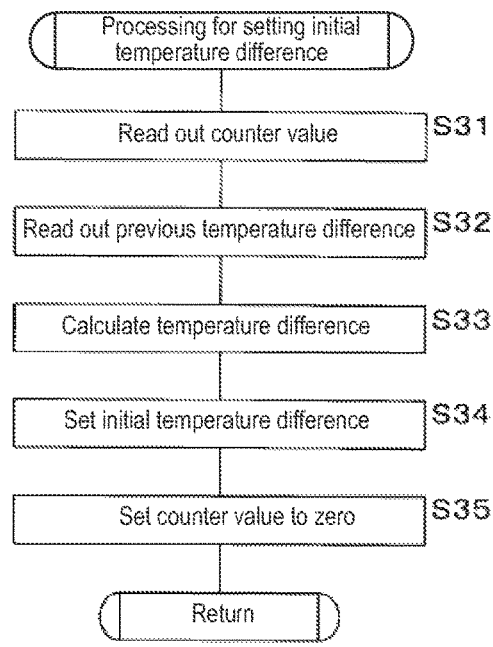
FIG. 4 is a flowchart showing the procedure of processing for setting an initial temperature difference that is executed by the control unit.

FIG. 4 is a flowchart showing the procedure of processing for setting the initial temperature difference ΔTi that is executed by the control unit 70. The processing for setting the initial temperature difference ΔTi is executed in the case where the control unit 70 resumes time-series calculation of the temperature difference ΔTw, after shifting the processing to the operation control processing, in step S24 of the check processing.

First, the control unit 70 reads out the counter value Nc from the storage unit 75 (step S31), and further reads out the previous temperature difference ΔTp from the storage unit 75 (step S32). The previous temperature difference ΔTp read out here is the temperature difference ΔTw calculated for the last time before the MICOM 7 transitions to the sleep state.

Next, the control unit 70 calculates a temperature difference ΔTc between the ambient temperature Ta of the electrical wire 5 and the electrical wire temperature, by substituting the counter value Nc and the previous temperature difference ΔTp that were respectively read out at steps S31 and S32 into the following computation equation (3) that is stored in the storage unit 75 (step S33).

$$\Delta Tc = \Delta Tp \times \exp(-(Nc \times t2)/\tau) \quad (3)$$

Here, the second time period t2 is in units of seconds.

The product of the counter value Nc and the second time period t2 is, as aforementioned, the elapsed time from suspension to resumption of calculation of the temperature difference ΔTw by the control unit 70. Accordingly, the computation equation (3) is based also on the aforementioned elapsed time (=Nc×t2) as well as being based on the counter value Nc.

The temperature difference ΔTc is the temperature difference between the ambient temperature Ta of the electrical wire 5 and the electrical wire temperature at the point in time at which the operation control processing is resumed. The computation equation (3) is derived from the computation equation (1). The previous temperature difference ΔTp is, as aforementioned, the temperature difference ΔTw calculated for the last time before the MICOM 7 transitions to the sleep state. Accordingly, in the computation equation (1), the temperature difference ΔTw in the case where the first time period t1 is the aforementioned elapsed time (=Nc×t2) is equivalent to the temperature difference ΔTc. The temperature difference ΔTc is thereby represented by the following computation equation (4).

$$\Delta Tc = \Delta Tp \times \exp(-(Nc \times t2)/\tau) + Rth \times Rw \times Iw^2 \times (1 - \exp(-(Nc \times t2)/\tau)) \quad (4)$$

Also, the control unit 70, in the operation control processing, transitions the MICOM 7 to the sleep state in a state in which the disconnect instruction is being output to the control circuit 61 of the IPD 6 by the output unit 74. Accordingly, while the MICOM 7 is in the sleep state, the control circuit 61 turns the FET 60 off and the value Iw of the current flowing through the electrical wire 5 is zero. The computation equation (3) is derived by substituting zero into the current value Iw of the computation equation (4).

The control unit 70 sets the initial temperature difference ΔTi that is stored in the storage unit 75 to the temperature difference ΔTc calculated at step S33 (step S34). In other words, at step S34, the temperature difference ΔTc calculated at step S33 is set as the initial temperature difference ΔTi. Thereafter, the control unit 70 sets the counter value Nc to zero (step S35), and returns the processing to the operation control processing.

As abovementioned, the computation equation (3) having the aforementioned elapsed time (=Nc×t2) as a variable is stored in the storage unit 75. Also, in setting the initial temperature difference ΔTi, the control unit 70 calculates the temperature difference ΔTc between the ambient temperature Ta of the electrical wire 5 and the electrical wire temperature, using the computation equation (3) that is stored in the storage unit 75, and sets the initial temperature difference ΔTi to the calculated temperature difference ΔTc. The control unit 70 also functions as a setting unit.

Also, because the computation equation (3) is derived from the computation equation (1), the initial temperature difference ΔTi that is set in the processing for setting the initial temperature difference ΔTi matches or approximately matches the actual temperature difference that occurs at the point in time at which the operation control processing is resumed.

Figure 5:
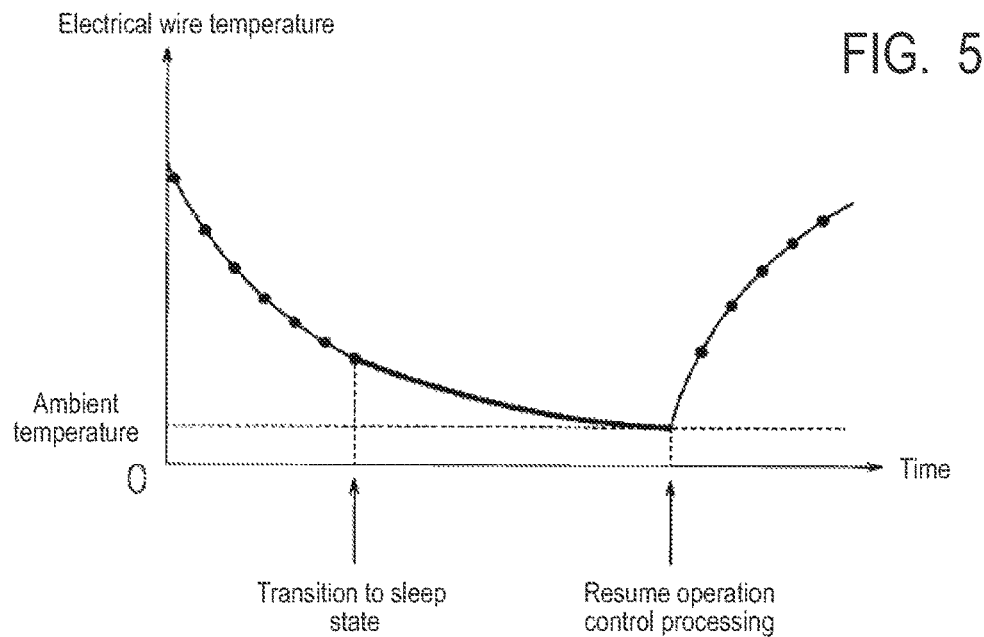
FIG. 5 is an illustrative diagram of the effects of a power supply control apparatus.

FIG. 5 is an illustrative diagram of the effects of the power supply control apparatus 2. In FIG. 5, the shift in the actual electrical wire temperature is shown with a thin solid line, and the electrical wire temperature calculated by the control unit 70 is shown with black dots. Furthermore, in FIG. 5, the shift in the electrical wire temperature obtained by adding the ambient temperature Ta to the initial temperature difference $\Delta Ti$ that is set in processing for setting the initial temperature difference $\Delta Ti$ is shown with a thick solid line. The portion where the shift in the actual electrical wire temperature overlaps with the shift in the electrical wire temperature obtained by adding the ambient temperature Ta to the initial temperature difference $\Delta Ti$ is shown with the thick solid line.

As shown in FIG. 5, the control unit 70, in the operation control processing, calculates the electrical wire temperature of the electrical wire 5, whenever the first time period t1 elapses. Since the electrical wire temperature is calculated using the computation equations (1) and (2), the calculated electrical wire temperature shifts similarly to the actual electrical wire temperature. The MICOM 7 transitions to the sleep state, and the control unit 70 suspends calculation of the temperature difference $\Delta Tw$. After the operation signal is input to the input unit 71 and the control unit 70 resumes the operation control processing, the electrical wire temperature is again calculated in time series.

As shown in FIG. 5, the initial temperature difference $\Delta Ti$ that is set in processing for setting the initial temperature difference $\Delta Ti$ matches or approximately matches the actual temperature difference. Thus, the electrical wire temperature calculated after the control unit 70 has resumed the operation control processing also approximately matches the actual electrical wire temperature. Accordingly, in FIG. 5, even in the case where, for example, the operation control processing is resumed in a state in which the actual electrical wire temperature exceeds the ambient temperature Ta, the calculated electrical wire temperature approximately matches the actual electrical wire temperature.

In the power supply control apparatus constituted as abovementioned, the control unit 70 is able to set the initial temperature difference $\Delta Ti$ to a temperature difference approximating the actual temperature difference that occurs at the point in time at which the operation control processing, that is, calculation of the temperature difference $\Delta Tw$, is resumed, based on the elapsed time ($=Nc \times t2$) from suspension to resumption of calculation of the counter value Nc, that is, time-series calculation of the temperature difference $\Delta Tw$.

Thus, even in the case where time-series calculation of the temperature difference $\Delta Tw$ is suspended in a state in which the temperature difference $\Delta Tw$ calculated in the operation control processing is sufficiently greater than approximately zero, and, furthermore, time-series calculation of the temperature difference $\Delta Tw$ is resumed in a state in which the actual temperature difference is high, a temperature difference $\Delta Tw$ approximating the actual temperature difference can be calculated, and the temperature difference $\Delta Tw$ can be appropriately calculated. Also, because time-series calculation of the temperature difference $\Delta Tw$ can be suspended even in the case where the temperature difference $\Delta Tw$ calculated in the operation control processing is large, the period for which the MICOM 7 is in the sleep state can be lengthen, and power consumption in the power supply control apparatus 2 can be lowered.

Furthermore, since the number of times that the control unit 70 executes the check processing is fewer in the case where the second time period t2 is longer than the first time period t1, power consumption in the power supply control apparatus 2 can be further lowered.

Second Embodiment

The computation equation that is used in the processing for setting the initial temperature difference $\Delta Ti$ is not limited to the computation equation (3), and may be a linear expression of elapsed time from stoppage to resumption of calculation of the counter value Nc, that is, time-series calculation of the temperature difference $\Delta Tw$.

Hereinafter, the second embodiment will be described, focusing on the differences from the first embodiment. The configuration of the second embodiment excluding the configuration that will be discussed later is similar to the first embodiment, and thus a detailed description thereof is omitted.

The power system 1 in the second embodiment mainly differs, in comparison with the power system 1 in the first embodiment, in the criteria according to which the control unit 70 determines whether to transition the MICOM 7 to the sleep state at step S13 of the operation control processing, and in the processing for setting the initial temperature difference $\Delta Ti$ that is executed by the control unit 70 of the power supply control apparatus 2.

In step S13 of the operation control processing in the second embodiment, the control unit 70 determines to transition the MICOM 7 to the sleep state, in the case where the period for which the stop signal has been input to the input unit 71 is greater than or equal to a predetermined period, and the temperature difference $\Delta Tw$ calculated at step S5 is less than or equal to a reference temperature difference $\Delta Ts$ that is set in advance. Also, the control unit 70 determines not to transition the MICOM 7 to the sleep state, in the case where the period for which the stop signal has been input to the input unit 71 is less than the predetermined period, or the temperature difference $\Delta Tw$ calculated at step S5 exceeds the reference temperature difference $\Delta Ts$.

Figure 6:
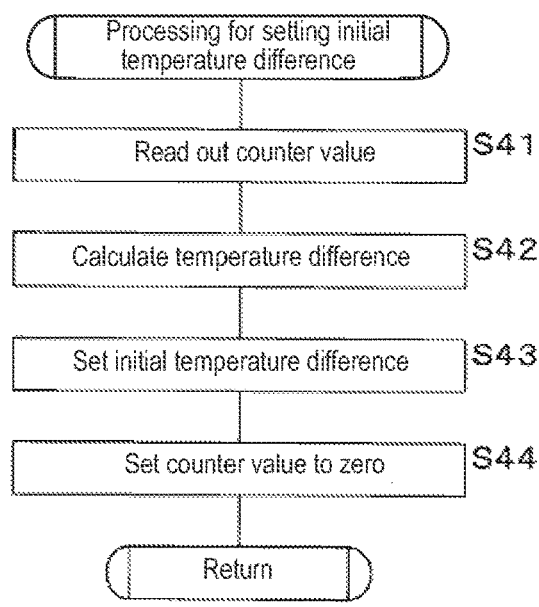
FIG. 6 is a flowchart showing the procedure of processing for setting the initial temperature difference that is executed by the control unit in a second embodiment.

FIG. 6 is a flowchart showing the procedure of processing for setting the initial temperature difference $\Delta Ti$ that is executed by the control unit 70 in the second embodiment. The processing for setting the initial temperature difference $\Delta Ti$ in the second embodiment is also executed in the check processing, in the case where the control unit 70 shifts the processing to the operation control processing and resumes calculation of the temperature difference $\Delta Tw$.

First, the control unit 70 reads out the counter value Nc from the storage unit 75 (step S41). Next, the control unit 70 calculates the temperature difference $\Delta Tc$ between the ambient temperature Ta of the electrical wire 5 and the electrical wire temperature, by substituting the counter value Nc read out at step S41 into the following computation equation (5) that is stored in the storage unit 75 (step S42).

$$\Delta Tc = -As \times (Nc \times t2) + \Delta Ts \quad (5)$$

Here, As is the magnitude (absolute value), that is, the slope (° C./s), of the temperature that falls per unit time. The slope As is a constant that is set in advance.

The product of the counter value Nc and the second time period t2 is the elapsed time from suspension to resumption of calculation of the temperature difference $\Delta Tw$ by the control unit 70, similarly to the first embodiment. Accordingly, the computation equation (5) is based also on the aforementioned elapsed time ($=Nc \times t2$), as well as being based on the counter value Nc, similarly to the computation equation (3).

Next, the control unit 70 sets the initial temperature difference $\Delta Ti$ that is stored in the storage unit 75 to the temperature difference $\Delta Tc$ calculated at step S42 (step S43). In other words, at step S43, the control unit 70 sets the temperature difference $\Delta Tc$ calculated at step S42 as the initial temperature difference $\Delta Ti$.

In step S45, however, in the case where the temperature difference ΔTc calculated at step S42 is negative, the control unit 70, in step S43, sets the initial temperature difference ΔTi to zero.

The control unit 70, after executing step S43, sets the counter value Nc to zero (step S44), and returns the processing to the operation control processing.

As abovementioned, the computation equation (5), which is a linear expression of elapsed time in which the aforementioned elapsed time, that is, the product of the counter value Nc and the second time period t2, serves as a variable is stored in the storage unit 75. Also, in setting the initial temperature difference ΔTi, the control unit 70 calculates the temperature difference ΔTc between the ambient temperature Ta of the electrical wire 5 and the electrical wire temperature, using the computation equation (5) that is stored in the storage unit 75, and sets the initial temperature difference ΔTi to the calculated temperature difference ΔTc.

Since the computation equation (5) is a linear expression of the aforementioned elapsed time, the control unit 70 is able to set the initial temperature difference ΔTi with lower power consumption.

Figures 7, 8:
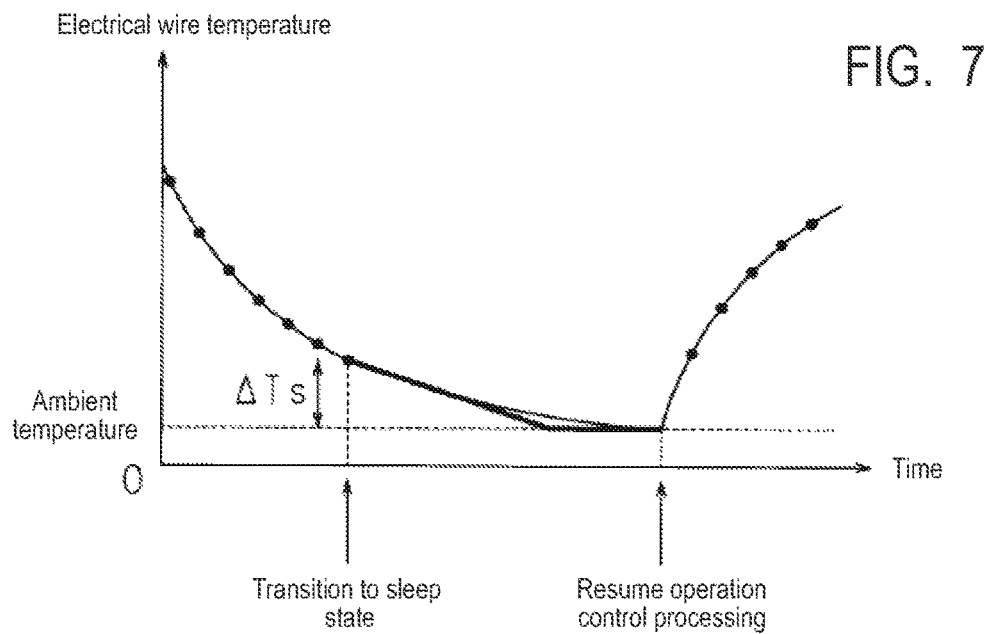
FIG. 7 is an illustrative diagram of the effects of the power supply control apparatus.
FIG. 8 is a table showing the correspondence relationship between counter values and set temperature differences in a third embodiment.

FIG. 7 is an illustrative diagram of the effects of the power supply control apparatus 2. The shift (thin solid line) in the actual electrical wire temperature, the electrical wire temperature (black dots) calculated by the control unit 70, and the shift (thick solid line) in the electrical wire temperature obtained by adding the ambient temperature Ta to the initial temperature difference ΔTi that is set in the processing for setting the initial temperature difference ΔTi, similarly to FIG. 5, are shown in FIG. 7. The portion where the shift in the actual electrical wire temperature overlaps with the shift in the electrical wire temperature obtained by adding the ambient temperature Ta to the initial temperature difference ΔTi is shown with the thick solid line.

Similarly to the first embodiment, with regard to the period before the MICOM 7 transitions to the sleep state and the period after the control unit 70 resumes the operation control processing, the control unit 70 is able to calculate the electrical wire temperature using the computation equations (1) and (2), and thus the calculated electrical wire temperature shifts similarly to the actual electrical wire temperature.

In the computation equation (5), the slope As is set, such that the initial temperature difference ΔTi that is set in the processing for setting the initial temperature difference ΔTi approximately matches the actual temperature difference. Thus, the electrical wire temperature calculated after the control unit 70 has resumed the operation control processing also approximately matches the actual electrical wire temperature. Accordingly, in FIG. 7, even in the case where, for example, the operation control processing is resumed in a state in which the actual electrical wire temperature exceeds the ambient temperature Ta, the calculated electrical wire temperature approximately matches the actual electrical wire temperature.

The configuration of the second embodiment apart from the abovementioned configuration is similar to the first embodiment. Thus, the power supply control apparatus 2 in the second embodiment similarly achieves the other effects excluding the effects that are obtained by using the computation equation (3) in the processing for setting the initial temperature difference ΔTi, among the effects that are achieved by the power supply control apparatus 2 in the first embodiment.

Note that, in step S13 of the operation control processing in the second embodiment, the control unit 70 may determine to transition the MICOM 7 to the sleep state, in the case where the period for which the stop signal has been input to the input unit 71 is greater than or equal to a predetermined period, regardless of the temperature difference ΔTw calculated at step S5. In this case, in the processing for setting the initial temperature difference ΔTi, the control unit 70 dynamically calculates the slope As from a plurality of temperature differences ΔTw(s) calculated in the past, for example, and the temperature difference ΔTc is calculated, using the computation equation (5) into which the calculated slope As has been substituted. Even in this case, the initial temperature difference ΔTi that is set in the processing for setting the initial temperature difference ΔTi can be approximately matched to the actual temperature difference.

Third Embodiment

The configuration that sets the initial temperature difference ΔTi is not limited to a configuration that uses computation equations, and may be a configuration that uses a correspondence table in which set temperature differences that are set in advance are associated with counter values Nc, that is, elapsed times from stoppage to resumption of time-series calculation of the temperature difference ΔTw.

Hereinafter, the third embodiment will be described, focusing on the differences from the first embodiment. The configuration of the third embodiment excluding the configuration that will be discussed later is similar to the first embodiment, and thus a detailed description thereof is omitted.

The power system 1 in the third embodiment mainly differs, in comparison with the power system 1 in the first embodiment, in the criteria according to which the control unit 70 determines whether to transition the MICOM 7 to the sleep state at step S13 of the operation control processing, and in the processing for setting the initial temperature difference ΔTi that is executed by the control unit 70 of the power supply control apparatus 2.

In step S13 of the operation control processing in the third embodiment, the control unit 70 determines to transition the MICOM 7 to the sleep state, in the case where the period for which the stop signal has been input to the input unit 71 is greater than or equal to a predetermined period, and the temperature difference ΔTw calculated at step S5 is less than or equal to a reference temperature difference ΔT1 that is set in advance. Also, the control unit 70 determines not to transition the MICOM 7 to the sleep state, in the case where the period for which the stop signal has been input to the input unit 71 is less than the predetermined period, or the temperature difference ΔTw calculated at step S5 exceeds the reference temperature difference ΔT1.

FIG. 8 is a table showing the correspondence relationship between counter values Nc and set temperature differences in the third embodiment. The correspondence relationship shown in FIG. 8 is stored in the storage unit 75. In the case where the counter value Nc is 1, the set temperature difference is the reference temperature difference ΔT1. In the case where the counter value Nc is between 2 and 4 inclusive, the set temperature difference is ΔT2, which is smaller than the reference temperature difference ΔT1. In the case where the counter value Nc is between 5 and 8 inclusive, the set temperature difference is ΔT3, which is smaller than ΔT2. In the case where the counter value Nc is between 9 and 13 inclusive, the set temperature difference is ΔT4, which is smaller than ΔT3. In the case where the counter value Nc is greater than or equal to 14, the set temperature difference is ΔT5, which is smaller than ΔT4. As abovementioned, small set temperature differences are associated with large counter values Nc, and large set temperature differences are associated with small counter values Nc. ΔT2, ΔT3, ΔT4 and ΔT5 are each values that are set in advance similarly to the reference temperature difference ΔT1.

The product of the counter value Nc and the second time period t2 is equivalent to the elapsed time from suspension to resumption of calculation of the temperature difference ΔTw by the control unit 70, and the second time period t2 is fixed. Thus, storing set temperature differences in association with counter values Nc is equivalent to storing set temperature differences in association with the aforementioned elapsed times (=Nc×t2).

Figure 9:
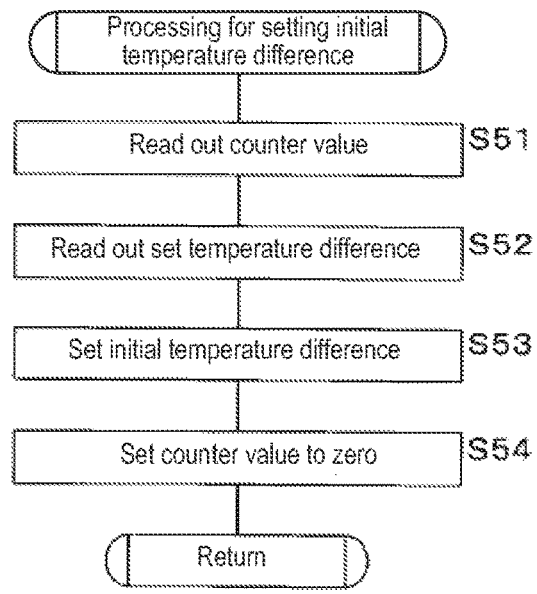
FIG. 9 is a flowchart showing the procedure of processing for setting the initial temperature difference that is executed by the control unit.

FIG. 9 is a flowchart showing the procedure of processing for setting the initial temperature difference ΔTi that is executed by the control unit 70. The processing for setting the initial temperature difference ΔTi in the third embodiment is also executed in the check processing, in the case where the control unit 70 shifts the processing to the operation control processing and resumes calculation of the temperature difference ΔTw.

First, the control unit 70 reads out the counter value Nc from the storage unit 75 (step S51). Next, the control unit 70 reads out the set temperature difference corresponding to the counter value Nc read out at step S51 from the storage unit 75 (step S52). As described in the first embodiment, counting the number of times that the second time period t2 has elapsed is equivalent to clocking the elapsed time from suspension to resumption of calculation of the temperature difference ΔTw. Accordingly, reading out the set temperature difference corresponding to the counter value Nc is equivalent to reading out the set temperature difference corresponding to the clocked elapsed time.

Next, the control unit 70 sets the initial temperature difference ΔTi that is stored in the storage unit 75 to the set temperature difference read out at step S52 (step S53). In other words, at step S53, the control unit 70 sets the set temperature difference read out at step S52 as the initial temperature difference ΔTi.

As abovementioned, the control unit 70 is able to set the initial temperature difference ΔTi with lower power consumption, without using computation equations.

The control unit 70, after executing step S53, sets the counter value Nc to zero (step S54), and returns the processing to the operation control processing.

Figure 10:
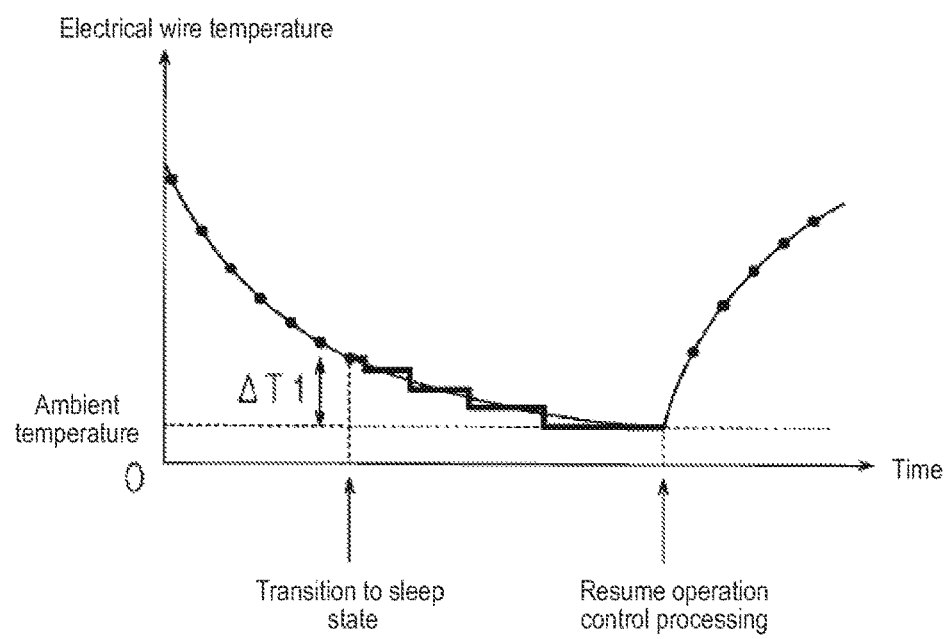
FIG. 10 is an illustrative diagram of the effects of the power supply control apparatus.

FIG. 10 is an illustrative diagram of the effects of the power supply control apparatus 2. The shift (thin solid line) in the actual electrical wire temperature, the electrical wire temperature (black dots) calculated by the control unit 70, and the shift (thick solid line) in the electrical wire temperature obtained by adding the ambient temperature Ta to the initial temperature difference ΔTi that is set in the processing for setting the initial temperature difference ΔTi, similarly to FIG. 5, are shown in FIG. 10. The portion where the shift in the actual electrical wire temperature overlaps with the shift in the electrical wire temperature obtained by adding the ambient temperature Ta to the initial temperature difference ΔTi is shown with the thick solid line.

Similarly to the first embodiment, with regard to the period before the MICOM 7 transitions to the sleep state and the period after the control unit 70 resumes the operation control processing, since the control unit 70 is able to calculate the electrical wire temperature using the computation equations (1) and (2), the calculated electrical wire temperature shifts similarly to the actual electrical wire temperature.

In the correspondence table of FIG. 8 that is stored in the storage unit 75, set temperature differences are associated with counter values Nc, such that the initial temperature difference ΔTi that is set in the processing for setting the initial temperature difference ΔTi approximately matches the actual temperature difference. In the case where the counter value Nc is less than or equal to 1, that is, in the case where the elapsed time exceeds zero and is less than or equal to t2, the initial temperature difference ΔTi is the reference temperature difference ΔTi.

Similarly, in the case where the counter value Nc is between 2 and 4 inclusive, that is, in the case where the elapsed time exceeds t2 and is less than or equal to 4×t2, the initial temperature difference ΔTi is ΔT2. In the case where the counter value Nc is between 5 and 8 inclusive, that is, in the case where the elapsed time exceeds 4×t2 and is less than or equal to 8×t2, the initial temperature difference ΔTi is ΔT3. In the case where the counter value Nc is between 9 and 13 inclusive, that is, in the case where the elapsed time exceeds 8×t2 and is less than or equal to 13×t2, the initial temperature difference ΔTi is ΔT4. In the case where the counter value Nc is greater than or equal to 14, that is, in the case where the elapsed time exceeds 13×t2, the initial temperature difference ΔTi is ΔT5.

Thus, the electrical wire temperature calculated after the control unit 70 has resumed the operation control processing also approximately matches the actual electrical wire temperature. Accordingly, in FIG. 10, even in the case where, for example, the operation control processing is resumed in a state in which the actual electrical wire temperature exceeds the ambient temperature Ta, the calculated electrical wire temperature approximately matches the actual electrical wire temperature.

The configuration of the third embodiment apart from the abovementioned configuration is similar to the first embodiment. Thus, the power supply control apparatus 2 in the third embodiment similarly achieves the other effects excluding the effects that are obtained by using the computation equation (3) in the processing for setting the initial temperature difference ΔTi, among the effects that are achieved by the power supply control apparatus 2 in the first embodiment.

Note that, in the first, second and third embodiments, the configuration that transitions the MICOM 7 to the sleep state is not limited to a configuration that stops power supply to the input units 71, 72 and 73, the output unit 74 and the A/D conversion unit 77 from the power source circuit 78. For example, the power supply control apparatus 2 may have an output circuit that outputs a clock signal, or specifically, a pulse signal whose pulse repeatedly rises or falls cyclically to the control unit 70, instead of the timer 76 and the power source circuit 78. In this case, the control unit 70 performs processing at the rise or the fall of the pulse of the clock signal that is output by the output circuit.

With such a configuration, the control unit 70, in step S13 of the operation control processing, causes the output circuit to lengthen the cycle of the clock signal, that is, the interval of the rise or the fall of the pulse by outputting a signal to the output circuit via the bus 79, and transitions the MICOM 7 to the sleep state. Also, in step S24 of the check processing, the control unit 70 causes the output circuit to shorten the cycle of the clock signal by outputting a signal to the output circuit via the bus 79, and wakes up the MICOM 7. The control unit 70 performs the operation control processing in the case where the cycle of the clock signal that is output by the output circuit is short, and performs the check processing in the case where the cycle of the clock signal that is output by the output circuit is long.

Also, in the first, second and third embodiments, the storage unit 75 may be a nonvolatile memory. In this case, the power source circuit 78 does not need to constantly supply power to the storage unit 75. Accordingly, in the case where the storage unit 75 is a nonvolatile memory, the power source circuit 78 stops power supply to the storage unit 75, in addition to power supply to the control unit 70, the input units 71, 72 and 73, the output unit 74 and the A/D conversion unit 77, when the sleep signal is input, and operation of the storage unit 75 is stopped. Also, in the case where the power source circuit 78 resumes power supply to the control unit 70, the input units 71, 72 and 73, the output unit 74, the storage unit 75 and the A/D conversion unit 77, these units operate and the MICOM 7 wakes up.

Furthermore, in the operation control processing in the first, second and third embodiments, the previous temperature difference $\Delta Tp$ is not limited to the temperature difference $\Delta Tw$ that was calculated last time, and need only be a previously calculated temperature difference $\Delta Tw$. For example, the control unit 70 may store two temperature differences $\Delta Tw$ that were calculated last time and the time before last, as previous temperature differences $\Delta Tp$, and may calculate the current temperature difference $\Delta Tw$ using these temperature differences.

The configuration that clocks the elapsed time from suspension to resumption of calculation of the temperature difference $\Delta Tw$ by the control unit 70 is not limited to a configuration that counts the number of times that the second time period t2 has elapsed. For example, the aforementioned elapsed time may be clocked by a timer, and the control unit 70 may set the initial temperature difference $\Delta Ti$ according to the clocked elapsed time. In this case, in both the first and second embodiments, the temperature difference $\Delta Tc$ is calculated by substituting the elapsed time clocked by the timer for Nc×t2 of the computation equations (3) and (5). In the third embodiment, set temperature differences are stored in association with time periods rather than counter values Nc, and the control unit 70 calculates the temperature difference $\Delta Tc$ by reading out the set temperature difference clocked by the timer.

The FET 60 need only function as a switch. Thus, the FET 60 may be a P-channel FET or, furthermore, a bipolar transistor may be used instead of the FET 60.

Furthermore, in step S13 of the operation control processing, determination by the control unit 70 as to whether to transition the MICOM 7 to the sleep state does not need to be based on whether the period for which the stop signal is input to the input unit 71 is greater than or equal to a predetermined period. The control unit 70 may determine whether to transition the MICOM 7 to the sleep state, based on whether a request signal requesting transition of the MICOM 7 to the sleep state has been input to the input unit 71, for example.

The disclosed first, second and third embodiments are considered in all respects to be illustrative and not restrictive. The scope of the invention is indicated by the claims rather than by the foregoing description, and all changes that come within the meaning and range of equivalency of the claims are intended to be embraced therein.

The invention claimed is:

1. A power supply control apparatus including a power supply control unit that, by turning a switch provided on an electrical wire on/off, controls power supplied via the electrical wire, the power supply control apparatus comprising: a calculation unit that calculates a temperature difference between an ambient temperature of the electrical wire and an electrical wire temperature in time series, based on a value of current flowing through the electrical wire, the calculation unit being configured to calculate the temperature difference based on a previous temperature difference calculated previously and the value of the current, and to suspend time-series calculation of the temperature difference in a state in which the power supply control unit has turned the switch off, and a clocking unit that clocks elapsed time from suspension to resumption of the calculation by the calculation unit; and a setting unit that, in the case where the calculation is resumed by the calculation unit, sets an initial temperature difference to be used as the previous temperature difference in an initial calculation after resumption, based on a temperature difference calculated before the calculation is suspended by the calculation unit and the elapsed time clocked by the clocking unit.

2. The power supply control apparatus according to claim 1:

wherein the setting unit is configured to calculate the temperature difference $\Delta Tc$ between the ambient temperature and the electrical wire temperature, by substituting the temperature difference $\Delta Tp$ calculated before the calculation is suspended by the calculation unit and the elapsed time to clocked by the clocking unit into the following equation, and to set the calculated temperature difference $\Delta Tc$ as the initial temperature difference, where $\Delta Tc = \Delta Tp \times \exp(-te/\tau)$ where $\tau$: electrical wire heat dissipation time constant of the electrical wire.

3. The power supply control apparatus according to claim 1, wherein the clocking unit is configured to clock the elapsed time by counting a number of times that a predetermined time period has elapsed from suspension of the calculation by the calculation unit, and the setting unit is configured to set the initial temperature difference, based on the number of times counted by the clocking unit.

4. The power supply control apparatus according to claim 1, wherein the power supply control unit is configured to turn the switch off in a case where the electrical wire temperature calculated by adding the ambient temperature to the temperature difference calculated by the calculation unit is greater than or equal to a predetermined temperature.

5. A power supply control apparatus including a power supply control unit that, by turning a switch provided on an electrical wire on/off, controls power supplied via the electrical wire, the power supply control apparatus comprising: a calculation unit that calculates a temperature difference between an ambient temperature of the electrical wire and an electrical wire temperature in time series, based on a value of current flowing through the electrical wire, the calculation unit being configured to calculate the temperature difference based on a previous temperature difference calculated previously and the value of the current, and to suspend time-series calculation of the temperature difference in a state in which the power supply control unit has turned the switch off, a clocking unit that clocks elapsed time from suspension to resumption of the calculation by the calculation unit; and a setting unit that, in the case where the calculation is resumed by the calculation unit, sets an initial temperature difference to be used as the previous temperature difference in an initial calculation after resumption, based on the elapsed time clocked by the clocking unit, and the calculation unit being configured to suspend the calculation in a case where the calculated temperature difference is less than a predetermined temperature difference.

6. The power supply control apparatus according to claim 5,
wherein the setting unit is configured to calculate the temperature difference $\Delta Tc$ between the ambient temperature and the electrical wire temperature, by substituting the elapsed time to clocked by the clocking unit and the predetermined temperature difference $\Delta Ts$ into the following equation, and to set the calculate temperature difference $\Delta Tc$ as the initial temperature difference, where $\Delta Tc = As \times te + \Delta Ts$, and where As: positive constant.

7. The power supply control apparatus according to claim 5, comprising:
a storage unit in which a temperature difference is stored in association with a time period,
wherein the setting unit is configured to read out a temperature difference corresponding to the elapsed time clocked by the clocking unit from the storage unit, and to set the read temperature difference as the initial temperature difference.

* * * * *